United States Patent
Nesset et al.

(10) Patent No.: US 8,433,194 B2
(45) Date of Patent: Apr. 30, 2013

(54) COMMUNICATIONS NETWORK

(75) Inventors: Derek Nesset, Langham (GB); Justin Kang, Ipswich (GB); Mark Wilkinson, Ipswich (GB); Kevin Smith, Ipswich (GB)

(73) Assignee: British Telecommunications, London (GB)

( * ) Notice: Subject to any disclaimer, the term of this patent is extended or adjusted under 35 U.S.C. 154(b) by 251 days.

(21) Appl. No.: 12/738,256

(22) PCT Filed: Oct. 15, 2008

(86) PCT No.: PCT/GB2008/003499
§ 371 (c)(1),
(2), (4) Date: Apr. 15, 2010

(87) PCT Pub. No.: WO2009/050459
PCT Pub. Date: Apr. 23, 2009

(65) Prior Publication Data
US 2010/0247098 A1 Sep. 30, 2010

(30) Foreign Application Priority Data
Oct. 15, 2007 (GB) .................................. 0720094.2

(51) Int. Cl.
*H04J 14/00* (2006.01)
(52) U.S. Cl.
USPC ...................... 398/58; 398/5; 398/67; 398/74
(58) Field of Classification Search .............. 398/1, 3–5, 398/25, 58, 59, 67, 70–72, 74, 75
See application file for complete search history.

(56) References Cited

U.S. PATENT DOCUMENTS

| | | | |
|---|---|---|---|
| 7,821,949 B2 * | 10/2010 | Mohan et al. .............. | 370/241.1 |
| 7,831,145 B2 * | 11/2010 | Gao et al. .......................... | 398/5 |
| 2007/0201872 A1 | 8/2007 | Yim et al. ...................... | 398/66 |
| 2007/0223399 A1 * | 9/2007 | Yang et al. .................... | 370/254 |

FOREIGN PATENT DOCUMENTS

| | | |
|---|---|---|
| EP | 1 746 857 | 1/2007 |
| EP | 1 784 045 | 5/2007 |

OTHER PUBLICATIONS

D. B. Payne and R. P. Davey, "*The future of fibre access systems,*" BTTJ, vol. 20-4, pp. 104-114, (Oct. 2002).
D. Hunter and T. Gilfedder, "*Routing and fast protection in networks of long-reach PONs,*" BTTJ, vol. 24-2, pp. 26-32 (Apr. 2006).
International Search Report for PCT/GB2008/003499, mailed Feb. 13, 2009.
Hunter, D. et al., "Routing and fast protection in networks of long-reach PONs", BT Technology Journal, vol. 24, No. 2, (Apr. 1, 2006), pp. 26-32.

* cited by examiner

*Primary Examiner* — Dalzid Singh
(74) *Attorney, Agent, or Firm* — Nixon & Vanderhye P.C.

(57) ABSTRACT

A PON in which parallel optical fiber paths are provided between dual OLTs and the ONTs, one of the optical fiber paths providing an active connection and the other optical fiber path providing a standby connection. Respective VLANs may be formed over the parallel optical fiber paths. If performance indicators, for example Ethernet continuity check messages, indicate that an ONT is no longer in communication with the OLT then data may be sent via the VLAN associated with the standby connection.

14 Claims, 3 Drawing Sheets

COMMUNICATIONS NETWORK

This application is the U.S. national phase of International Application No. PCT/GB2008/003499 filed 15 Oct. 2008, which designated the U.S. and claims priority to GB Application No. 0720094.2 filed 15 Oct. 2007, the entire contents of each of which are hereby incorporated by reference.

BACKGROUND AND SUMMARY

The present invention relates to optical communications networks, and in particular to resilient optical communications networks.

Broadband services are commonly supplied over legacy telephony networks using digital subscriber line (DSL) technology. One of the limitations of DSL is that the maximum data rate is not that high (for example, the maximum bit-rate is around 20 Mb s$^{-1}$) and that the available bit rate decreases as the distance between the customer and the telephone exchange increases. It is believed that future broadband services are increasingly likely to be offered over optical fibre infrastructure using passive optical network (PON) architectures (D. B. Payne and R. P. Davey, "*The future of fibre access systems*", BTTJ, Vol. 20-4, pp 104-114, (2002)). There are a number of large scale PON deployments currently underway around the world using either IEEE EPON technology or FSAN/ITU BPON and GPON. There is an emerging trend from network operators to consolidate network nodes and to reduce the amount of real estate used, leading to reductions in operational costs. A consequence of centralising network equipment into a smaller number of network nodes is that the network is more vulnerable to large scale outages in the event that a node is rendered out of service due to some catastrophic fault (fire, earthquake etc.).

According to an aspect of the present invention there a communications network comprising first and second optical line terminals and one or more optical network terminals wherein: i) the first optical line terminal has a first network connection to the one or more optical network terminals and the second optical line terminal has a second network connection to the one or more optical network terminals; ii) a virtual LAN connection is made to each of the one or more optical network terminals via the first network connection; and ii) a virtual LAN connection is made to each of the one or more optical network terminals via the second network connection.

Preferably the network is connected to one or more communications servers, wherein the virtual LAN connections established in steps ii) & iii) are extended to the one or more communications servers. The first network connection may be an active connection used to transmit data to and/or receive data from the one or more optical network terminals whilst the second network connection may be a standby connection. In use, a decision may be made to switch from the active first network connection to the standby second network connection for one or more of the optical network terminals. This decision to switch from the active connection to the standby connection may be made in response to network performance indicators associated with the virtual LAN connection made via the first network connection. The virtual LAN connection may comprise an Ethernet VLAN and the network performance indicators may comprise one or more Ethernet continuity check messages. Furthermore, in use, if the network switches from the active connection to the standby connection for a non-responsive optical network terminal, continuity check messages may be sent to one or more selected optical network terminals which are connected to the same network infrastructure as the responsive optical network terminal.

There are protection mechanisms already defined in PON standards e.g. G.984 series, but these assume that the standby OLT resides at the same central office location, which is not acceptable when protecting against catastrophic failures. Hence new mechanisms need to be defined for this network architecture. Furthermore, higher network layers (Ethernet, IP . . . ) need to be able to switch traffic to the correct OLT in the event of a failure. The responsibility for the management and operation of these layers may reside with independent service providers, with no direct access to the PON management system. The present invention provides a network structure that enables dual homing protection with a standard GPON product and also a mechanism for the higher layers to react when there has been a traffic switch to a protection OLT.

The solution proposed here for the provision of resilient services over a dual-homed GPON infrastructure involves protection at two levels: the physical layer protection of the PON itself and protection switching of services at the Ethernet layer. The physical layer protection of the PON is handled by the GPON management system and the service protection switching relies on recently ratified Ethernet Operations, Administration and Maintenance (OAM) standards for Connectivity Fault Management (IEEE 802.1ag/ITU-T Y.1731).

BRIEF DESCRIPTION OF THE DRAWINGS

The invention will now be described with reference to the following Figures, which are provided by way of example only, in which.

DETAILED DESCRIPTION OF PRESENT EXAMPLE EMBODIMENTS

Figure 1:
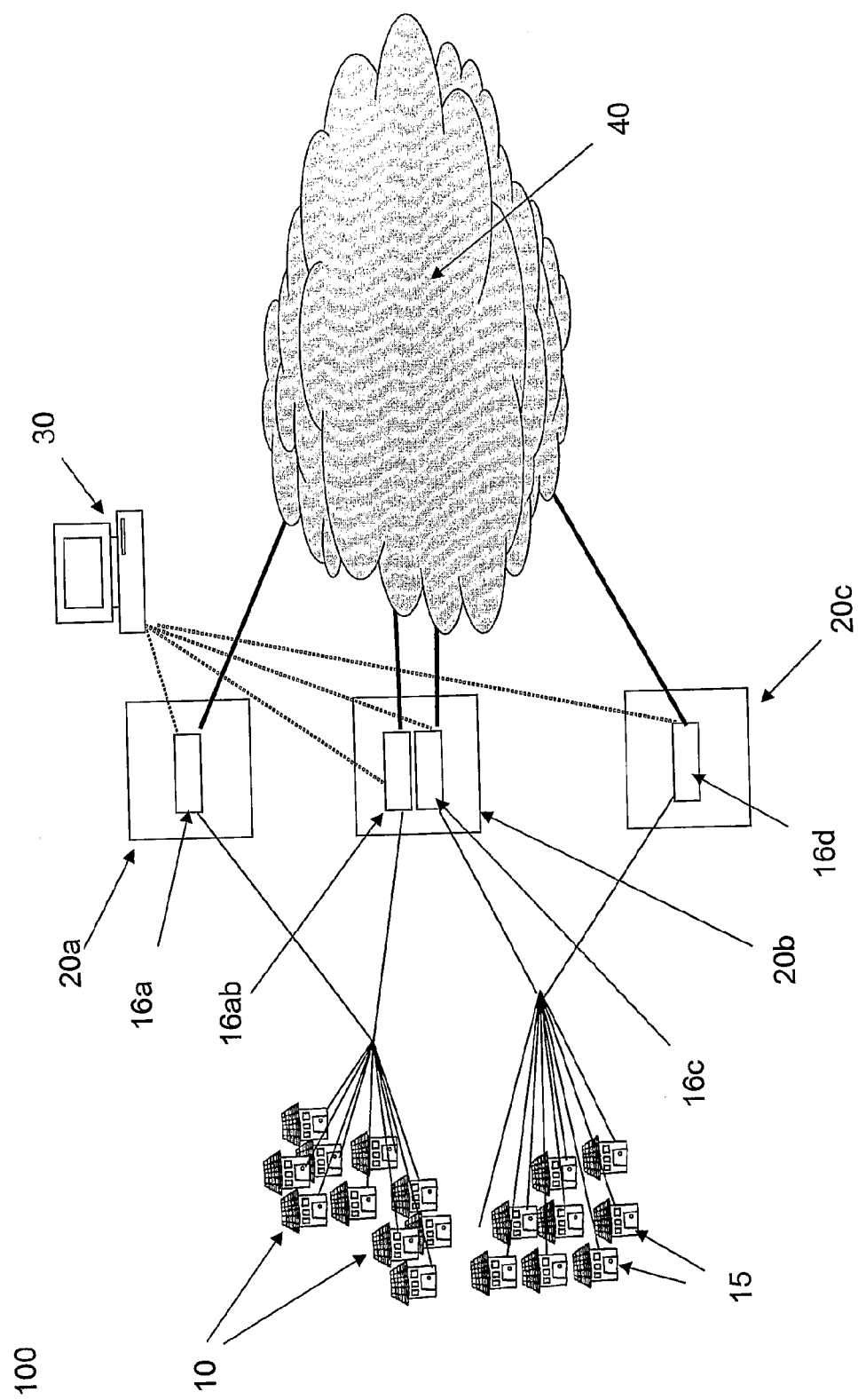
FIG. 1 shows a schematic depiction of a network architecture that is used to increase the resilience of PONs.

FIG. 1 shows a schematic depiction of a conventional network architecture that is used to increase the resilience of PONs. A PON 100 comprises a first plurality of optical network terminals (ONTs) 10 and a second plurality of optical network terminals (ONTs) 15. The first plurality of optical network terminals (ONTs) 10 are connected to a first optical line terminal (OLT) at network node 20a via optical fibres and a passive optical splitter. The first OLT 16a is then connected on to a core network 40 for the subsequent routing of traffic. To provide resilience, the first plurality of ONTs is also connected to a second OLT 16b at network node 20b, which is also connected to the core network 40. Similarly, the second plurality of ONTs 15 are connected to a first OLT 16c, which is located at the second network node 20b and to a second OLT 16d which is located at a third network node 20d.

Conventionally, the first plurality of ONTs will communicate with the first OLT but in the event of a network fault, or other contingency, then the first plurality of ONTs will switch to the second OLT. This architecture is commonly referred to as a dual-homed PON (see D. Hunter and T. Gilfedder, "*Routing and fast protection in networks of long-reach PONs*", BTTJ, Vol. 24-2, p.p. 26-32 (2006)). Similarly, the second plurality of ONTs are dual homed to OLTs at network nodes 20b & 20c. All of the OLTs at the various network nodes 20a, 20 & 20c are connected to a PON management system 30.

Figure 2:
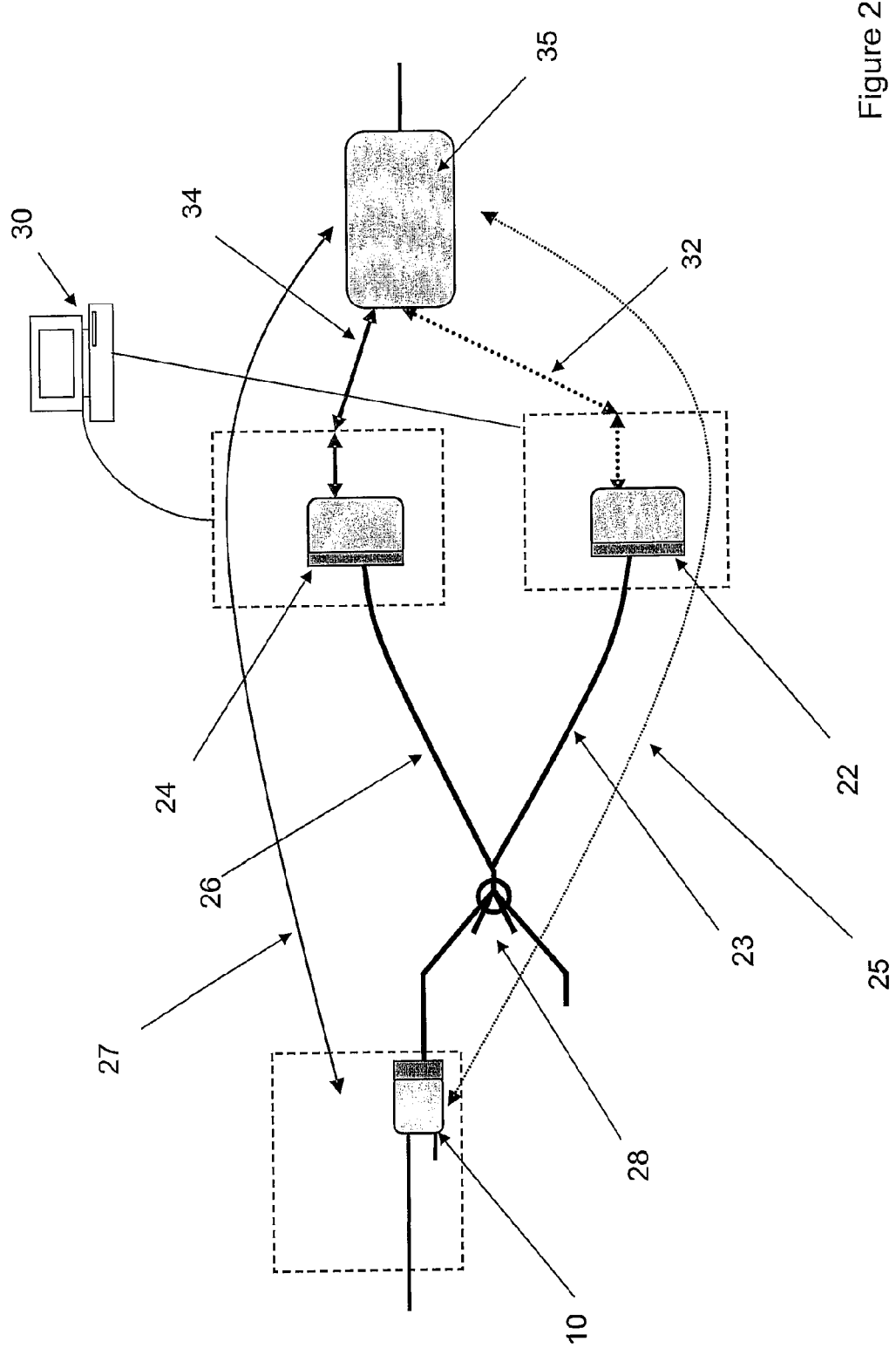
FIG. 2 shows a schematic depiction of a network according to the present invention.

FIG. 2 shows a schematic depiction of a network according to the present invention. ONT 10 is in communication with first and second OLTs 22, 24 via a PON comprising an optical splitter 28 and optical fibre links 23 & 26. A first optical fibre 23 connects the ONT to first OLT 22 and a second optical fibre 26 connect the ONT to the second OLT 24. Both the first and the second OLTs are connected to a PON management system 30. Both the first and the second OLTs are connected to communications server 35, via first and second communications links 32 & 34. First and second communications links 32 & 34 should be routed separately otherwise the benefits of providing separate first and second optical fibre links will be lost. The communications server 35 is in communications with one or more core networks 40.

For the sake of simplicity FIG. 2 shows only a single ONT 10 but it will be understood that in practice a PON will comprise many ONTs, possibly in excess of 100.

In the event that the PON management system 30 detects the failure of the active OLT (for example, first OLT 22) then it will cause the backup OLT (second OLT 24) to initiate communications with the ONT. Similarly, if a fault in the PON infrastructure is detected, (for example a break in one of the optical fibre links 26) then the PON management system can switch all the affected ONTs across to the backup OLT.

FIG. 2 also shows that resilient connections may be formed at the application level, with first and second Ethernet VLANs (Virtual Local Area Networks) 25 & 27 being formed between the communications server 35 and the ONT, with the first VLAN 25 being routed via the first OLT 22 and first optical fibre link 23. Similarly, the second VLAN 27 is routed via the second OLT 24 and second optical fibre link 26.

In addition to the traffic sent to the ONT in response to customer actions or requests, Ethernet continuity check messages (CCMs) are sent between the ONT and the communications server, with the same VLAN being used for the customer traffic and the CCMs. The CCMs are defined in the Ethernet Operations, Administration and Maintenance (OAM) standards for Connectivity Fault Management (see IEEE 8021 ag, "OAM Functions and Mechanism for Ethernet based networks-Amendment 5: CFM", Feb. 8, 2007).

Under normal operation, a series of CCMs are transmitted from the OLT to each of the ONTs, with each ONT sending an acknowledgement that the CCM was received from the OLT. In the event of an OLT failure, or a fibre break, the continuity messages are lost and this causes the PON management system to switch from the active VLAN to the backup VLAN (i.e. from the first VLAN to the second VLAN or vice versa), which is carried via the back-up OLT. Once the backup OLT has successfully restored connectivity to the ONT the Ethernet service can resume over the backup VLAN. Customer traffic and continuity check messages can now be sent over the backup VLAN until the original fault has been repaired and the network operator is ready to revert to the original active VLAN.

In a particular embodiment of the present invention, the communications server can take advantage of the PON architecture to provide information regarding the state of the network or of the active OLT. For example, if the active OLT where to fail, or if there were to be a break in the optical fibre in between the OLT and the splitter, then none of the ONTs connected to the PON would be able to receive, or respond to, a CCM. Similarly, for a PON with 64 ONTs, in which the optical splitter is formed from a 2×8 splitter to which each of the outputs is connected to a 1×8 splitter, if one of the 1×8 splitters were to fail then all eight of the ONTs connected to that splitter would not be able to receive, or respond to, a CCM. Furthermore, if there were to be a failure of the optical fibre between the optical splitter and the customer premises then it is likely that this mean that only a single ONT would not be able to receive, or respond to, a CCM. Thus, by analysing the distribution of received CCMs it is possible to infer the status of the active OLT, the network infrastructure and the ONTs without the service provider operating the communications server having access to the PON management system 30.

It will be understood that sending CCMs to all ONTs will increase the proportion of network traffic that is used by network management overhead. Thus, rather than sending CCMs to all ONTs, the communications server may send a CCM only to selected subsets of the ONTs. For example, the communications server may send the CCMs to ONTs at random, or alternatively the communications server may hold a list of ONTs and sequentially cycle through the ONTs to select ONTs which are to receive a CCM.

The results of which ONTs respond with an acknowledgement to a CCM can be stored to build up a map of working ONTs. In the event that an ONT does not respond then the communications server may take further action to determine if any other ONTs are not responding. For example, the communications server may send further CCMs to a non-responsive ONT: if, for example, an ONT does not respond to three consecutive CCMs then it may be assumed that connection has been lost to that ONT (it will be understood that a different threshold value for CCMs may be selected).

The communications server then may send CCMs to selected ONTs to obtain information that may be used to determine where the network fault(s) may be. By sending CCMs to other ONTs that share some part of the PON infrastructure with the non-responsive ONT then it is possible to diagnose where the network failure has occurred and how many ONTs have been effected by the fault.

For example, if one ONT becomes non-responsive then CCMs may be sent to all of the other ONTs that are connected to the same secondary optical splitter; if the other ONTs respond then it is most likely that the fault is in the non-responsive ONT or the connection between the non-responsive ONT and the secondary optical splitter. If non of the ONTs respond then it is likely that there is a fault in the network infrastructure. If ONTs connected to other secondary optical splitters are responsive then it is likely that there is a fault with one of the secondary optical splitter. The information derived from the analysis of CCMs can be used to initiate a switch to the backup VLAN in the event that no responses are received from any ONTs or to cause further investigations and/or repair work to be made in the event that only a subset of ONTs are non responsive.

The sequential transmission method of CCMs according to the present invention causes less network bandwidth is lost to management overheads when compared to sending CCMs to all ONTs. Furthermore, the present invention requires less of a processing overhead from a communications server in transmitting CCMs, tracking the acknowledgments received from ONTs and then initiating further actions when acknowledgements are not received.

FIG. 2 shows only a single communications server 35. It should be understood that the main and back-up OLTs may be connected to a plurality of communications servers with each of the communications servers being associated with a different communications provider, in the event that the regulatory regime mandates that a number of communications providers are allowed to provide services over a communications network owned by a different network operator (although the same entity may operate the communications network as well as a communications server).

Figure 3:
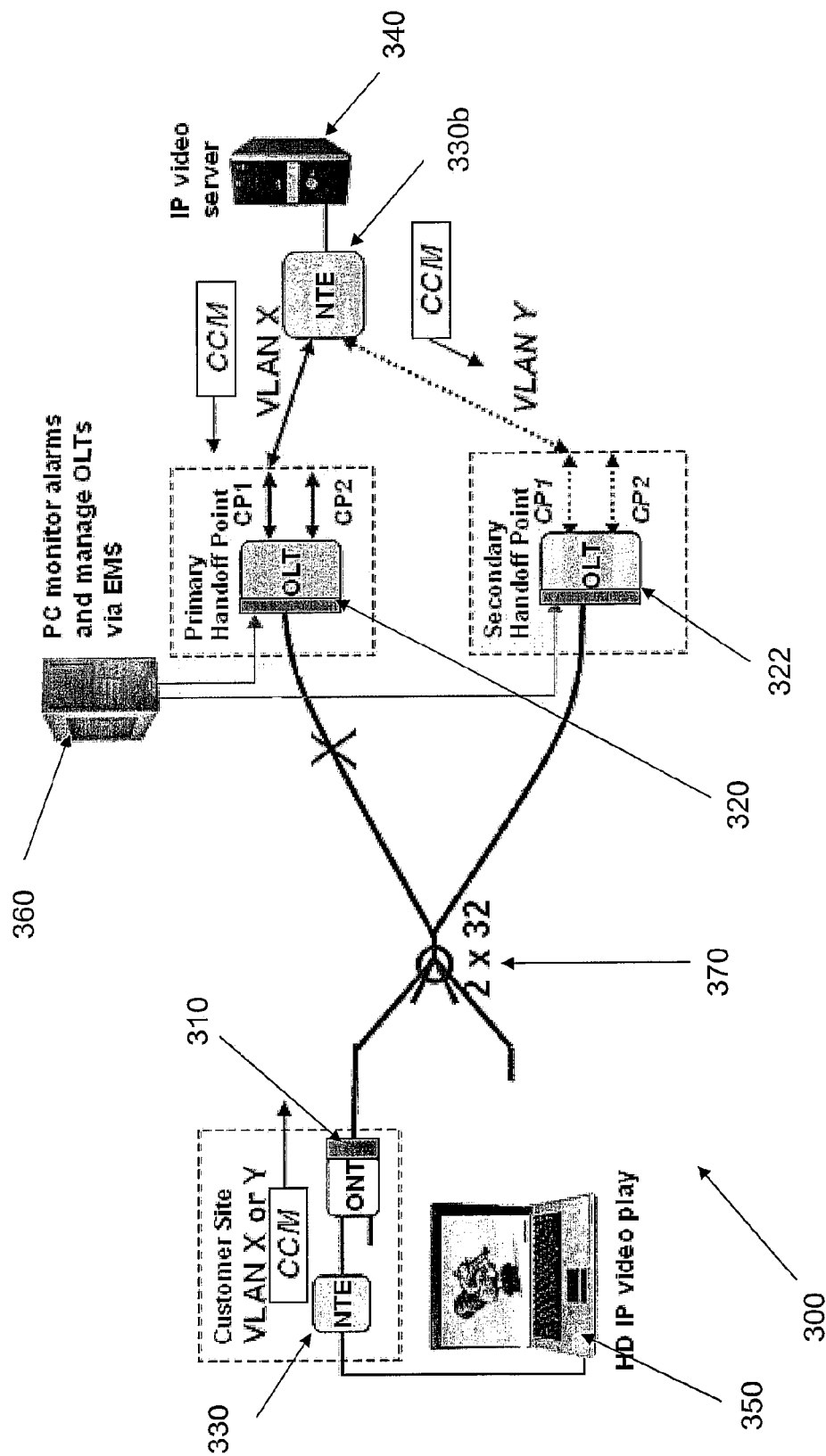
FIG. 3 shows a schematic depiction of a dual-homed GPON Ethernet service demonstrator.

FIG. 3 shows a schematic depiction of a dual-homed GPON Ethernet service demonstrator which can be operated in accordance with the present invention. The demonstrator 300 comprises two Siemens GPON OLTs (hiX 5750) 320 & 322 a number of GPON ONTs (hiX57XX) 310, two Ethernet Network Termination Equipment (NTE) devices (RAD ETX102) 330, an IP video server 340 and a PC 350 to receive and play video streams. The NTEs provide the required Ethernet OAM functionality which is not supported currently on the other equipment (it is expected that this functionality will be implemented in the OLT/ONT and Ethernet switches in the near future). The ONTs are dual-homed to two OLTs through a splitter 370. The two OLTs should be located at different geographical locations to provide resilience. Each ONT is then registered on both the primary and secondary OLTs. To avoid physical interference through the optical splitter, only one of the OLTs can be active at any one time.

When either of the OLTs is switched on, the ONT automatically ranges to it and the configured service profile is applied. The same service profile is configured in both OLTs via the Element Management System (EMS) 360. A second PC is used to run software to monitor the alarms of the GPON and control the GPON via the EMS 360. When the primary OLT fails or the fibre is broken, the alarms are detected, leading to the primary OLT being disabled and the secondary OLT being enabled. The ONT is now connected to the secondary OLT and ranges to it automatically. Ethernet and higher layer services are restored after the ranging finishes. Both ONT and OLT use Ethernet ports to provide services.

The NTEs have two types of Ethernet ports: user ports and net ports. User ports are connected to end users or communications servers (in the demonstrator, the IP video server 340 takes the role of the communications server). Net ports are connected to ONT or OLT Ethernet ports and support Maintenance association End Points (MEP) per port per VLAN. The end-to-end Continuity Check Messages (CCM) are only transmitted between the net ports of the NTEs. GPON provides 1:1 VLAN connections. The primary OLT uplink Ethernet port is connected to an NTE 330b of the IP video server using a first VLAN. The secondary OLT is connected to the same IP video server NTE 330b using a second VLAN. In normal operation, the IP video server uses the first VLAN and monitors the connectivity of the VLAN using CCMs. Following the loss of three consecutive CCMs, the NTEs switch to send customer data and CCMs on the second VLAN, so that traffic is directed towards the secondary OLT. The CCMs always use the same VLAN as customer data.

The interval between CCMs can be configured according to different failure response time and overhead requirements; for example it may be 25 ms. A fault can be simulated by disconnecting the primary OLT fibre, which causes a loss of signal alarm to be detected by the EMS. According to the alarm, the primary OLT port is disabled and the secondary OLT port is enables via the EMS. The video traffic is disrupted and the picture is frozen when the fibre is disconnected. The IP video server will detect an increase in CCMs and thus switch from the first VLAN to the second VLAN. When the connectivity is restored using the secondary VLAN, the video will resume playing. The service disruption time consists of the software overhead (~9 s), the ONT re-ranging time and the Ethernet restoration time. The average service disruption time is 26 seconds. It is thought that with improvements to the process it is possible to reduce the service disruption to less than 1 second.

Although the preceding discussion has focused on PONs it will be readily understood that the present invention is also capable of use with other network structures, for example Fibre to the Cabinet (FTTCab) or Fibre to the Kerb (FTTK) in which the portion of the network that is not optical fibre comprises a wireless link or a twisted pair or coaxial cable connection. In general, if there is some degree of physical separation in the network path between the service provider (or the hardware of the network provider) then it is possible to utilise the present invention to provide additional duplication at the service level. It will be understood that other performance indicators may be used as an alternative to the Ethernet continuity check messages or in addition to CCMs. A composite performance indicator may be generated based on the values of a number of different parameters.

What is claimed is:

1. A communications network comprising:
   first and second optical line terminals; and
   one or more optical network terminals wherein:
   the first optical line terminal has a first network connection to the one or more optical network terminals and the second optical line terminal has a second network connection to the one or more optical network terminals;
   a first virtual LAN connection is made to each of the one or more optical network terminals via the first network connection; and
   a second virtual LAN connection is made to each of the one or more optical network terminals via the second network connection;
   the communications network is configured so that:
   the first network connection and the second network connection are both routed to the one or more optical network terminals via shared network infrastructure;
   the first network connection is an active connection used to transmit data to and/or receive data from the one or more optical network terminals;
   the second network connection is a standby connection; and
   a decision is made to switch from the active first network connection to the standby second network connection for one or more of the optical network terminals, the decision being made in response to network performance indicators associated with the first virtual LAN connection.

2. A communications network according to claim 1, wherein the network is connected to one or more communications servers, and the first and second virtual LAN connections are extended to the one or more communications servers.

3. A communications network according to claim 1, wherein at least the first virtual LAN connection comprises an Ethernet VLAN and the network performance indicators comprise one or more Ethernet continuity check messages.

4. A communications network according to claim 3, wherein continuity check messages are sent to a random selection of optical network terminals.

5. A communications network according to claim 3, wherein continuity check messages are sent to optical network terminals that are sequentially selected from the one or more random selection of optical network terminals.

6. A communications network according to claim 3, wherein, in use, the network switches from the active connection to the standby connection when three consecutive Ethernet continuity check messages are not received from one of the optical network terminals.

7. A communications network according to claim 3, wherein, in use, if the network switches from the active connection to the standby connection for a non-responsive optical network terminal, continuity check messages are sent to one or more selected optical network terminals which are connected to the same network infrastructure as the responsive optical network terminal.

8. A method of controlling a communications network comprising first and second optical line terminal and one or more optical network terminals, the first optical line terminal having a first network connection to the one or more optical network terminals and the second optical line terminal having a second network connection to the one or more optical network terminals, the method comprising:
- making a first virtual LAN connection to each of the one or more optical network terminals via the first network connection;
- making a second virtual LAN connection to each of the one or more optical network terminals via the second network connection;
- routing both the first network connection and the second network connection to the one or more optical network terminals via shared network infrastructure;
- using the first network connection as an active connection to transmit data to and/or receive data from the one or more optical network terminals;
- using the second network connection as a standby connection; and
- making a decision, using at least one computer processor, to switch from the active first network connection to the standby second network connection for one or more of the optical network terminals, the decision being made in response to network performance indicators associated with the first virtual LAN connection.

9. The method according to claim 8, wherein the network is connected to one or more communications servers, wherein the first and second virtual LAN connections are extended to the one or more communications servers.

10. The method according to claim 8, wherein at least the first virtual LAN connection comprises an Ethernet VLAN and the network performance indicators comprise one or more Ethernet continuity check messages.

11. The method according to claim 10, wherein continuity check messages are sent to a random selection of optical network terminals.

12. The method according to claim 10, wherein continuity check messages are sent to optical network terminals that are sequentially selected from the one or more random selection of optical network terminals.

13. The method according to claim 10, wherein the network switches from the active connection to the standby connection when three consecutive Ethernet continuity check messages are not received from one of the optical network terminals.

14. The method according to claim 10, wherein if the network switches from the active connection to the standby connection for a non-responsive optical network terminal, continuity check messages are sent to one or more selected optical network terminals which are connected to the same network infrastructure as the responsive optical network terminal.

* * * * *

UNITED STATES PATENT AND TRADEMARK OFFICE
CERTIFICATE OF CORRECTION

PATENT NO. : 8,433,194 B2  
APPLICATION NO. : 12/738256  
DATED : April 30, 2013  
INVENTOR(S) : Nesset et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 253 days.

Signed and Sealed this
Eighth Day of September, 2015

Michelle K. Lee
*Director of the United States Patent and Trademark Office*